PRINTED CIRCUIT BOARD

Filed Aug. 22, 1957 2 Sheets-Sheet 1

INVENTOR.
JOHN DAWSON MILLER
BY Lyon & Lyon
ATTORNEYS

Feb. 2, 1960 J. D. MILLER 2,923,860

PRINTED CIRCUIT BOARD

Filed Aug. 22, 1957 2 Sheets-Sheet 2

INVENTOR.
JOHN DAWSON MILLER
BY Lyon & Lyon
ATTORNEYS

United States Patent Office 2,923,860

Patented Feb. 2, 1960

2,923,860

PRINTED CIRCUIT BOARD

John Dawson Miller, Alhambra, Calif.

Application August 22, 1957, Serial No. 679,579

2 Claims. (Cl. 317—101)

This invention relates to electronic circuit boards and is more particularly concerned with the construction and simplification of electronic circuits employing circuits printed on plastics, masonite, and the like.

Printed circuits are in common use in many applications. These circuits are used to simplify wiring procedures in various fields of commercial and experimental electronics where numbers of wires, capacitors, coils, resistors and the like must be placed in the circuit and be readily accessible for repair and replacement as well as to simplify the original construction processes. Many of these circuits for one type of apparatus may be photographed or reproduced on suitable insulating materials and their component parts quickly and easily placed on the printed circuit thus produced.

In the construction of instrument panels, particularly for aircraft use, weight and rigidity also present a major factor of design.

The principal object of this invention is to provide a panel for instruments or the like which is rigid, or light weight and which is particularly constructed so as to enable the use of advanced printed circuit techniques.

An object of this invention is the provision of a panel material which is particularly applicable for construction of a printed circuit, which may have circuit material printed on either or both surfaces and may be supported for increased strength by a heavy gauge light weight metal supporting material in a combination of laminations whereby plastic is used on the top which may be colored and lettered to eliminate the need of further finishing.

A further object of this invention is to provide a paneling material which is particularly applicable for the construction of a panel which has insulating or surface material, lettering as used in aircraft and the like in such a way that they may be readily and easily lighted by either direct or indirect means.

A further object of this invention is the provision of a paneling material particularly applicable for the construction of a panel for the support, wiring and lighting of meters, dials and the like directly upon an insulating material surface and having the combined circuitry printed, stamped, etched or by other suitable means produced on said panel and hereinafter referred to as printed circuits so as to have said panel, meters, and other like components combined into one easily accessible unit.

Further objects, features and advantages will be apparent from a consideration of the following description when taken in connection with the accompanying drawings in which.

Figure 1:
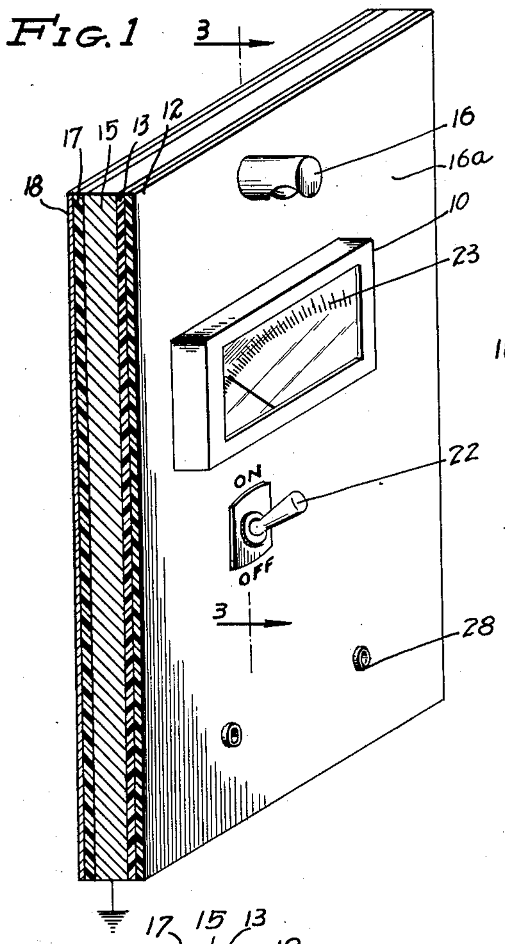
Figure 1 is a view of a paneling material embodying my invention.
Figure 2:
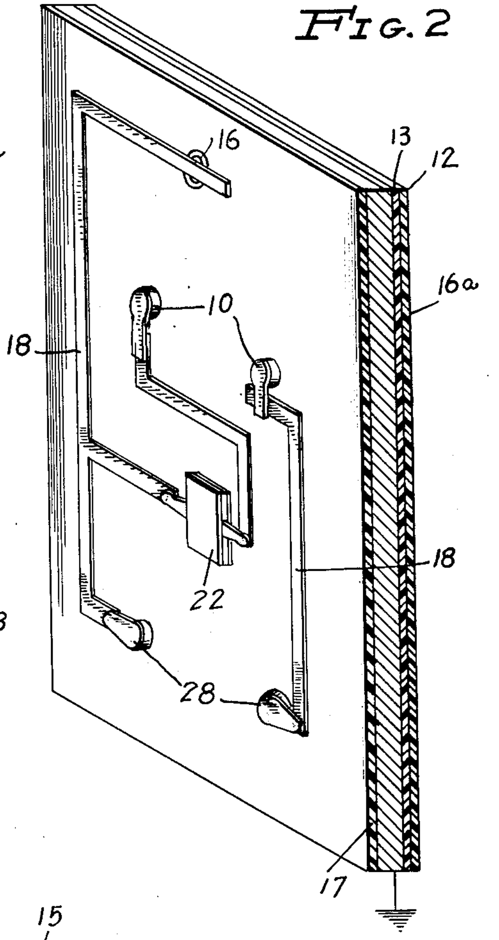
Figure 2 is the back side of Figure 1.
Figure 3:
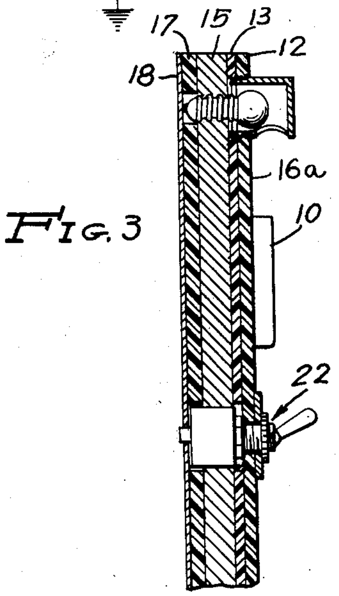
Figure 3 is taken along the lines 3—3 of Figure 1.
Figure 4:
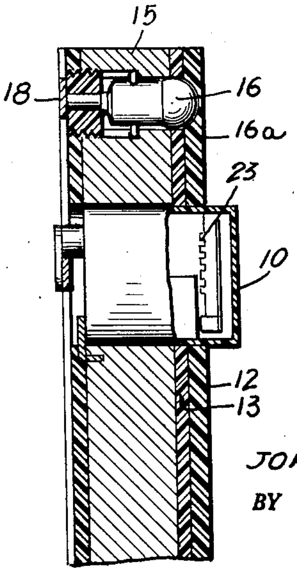
Figure 4 illustrates a modified form of paneling means and of lighting the surface thereof.
Figure 5:
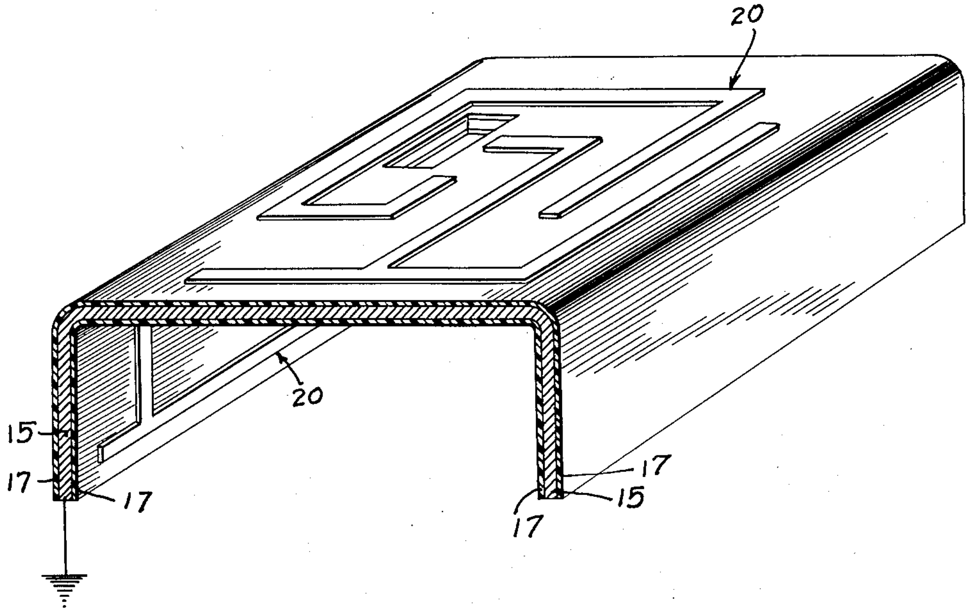
Figure 5 is a chassis demonstrating a further use of my invention.
Figure 6:
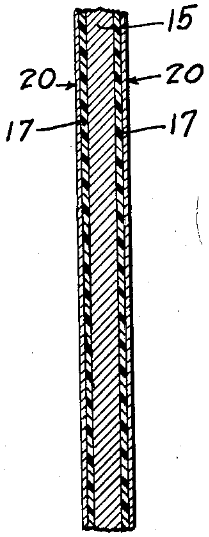
Figure 6 is taken along the lines 6—6 of Figure 5.

In the preferred embodiment of my invention as illustrated in the drawings I have shown circuit boards embodying my invention for both panels and chassis.

Referring to Figure 1 for an example of my invention, a light weight heavy gauge metal 15 has bonded to its surfaces insulating material 17, and 13. To one insulating layer 17 is bounded a layer of conductive material 18, such as copper of a suitable gauge to carry the required current. To the opposite layer of insulating material 13 is bonded a second layer of plastic 12 which may be colored and lettered 23 and supports a meter 10, a lighting means 16, a switch 22, and suitable plugs or jacks or other desired electrical contacts 28. The light weight heavy gauge metal 15 is so positioned as to add supportive strength of the panel and may be used as a common circuit tiepoint, such as a common ground point. The layer of conductive material 18 may have a circuit drawn upon its surface with an acid resistant material and the excess copper etched away so as to form a desired functional circuit whereby meter 10 may be connected to switch 22 and contacts 28 or other components placed on the panel.

The lighting of the panel may be through indirect means 16 whereby the layer of plastic 13 is so constructed as to transmit light to lettering on the panel 23 and then said lettering reflects said light to illuminate said lettering. Lighting may also be provided by suitable means from the surface 16*a*.

These printed circuits backed up by suitable strengthening materials, such as heavy gauge metals 15 may be used as electronic chassis, cabinets and the like, where means are provided for tubes, transformers and various other electronic components known to those skilled in the art and suitable electronic circuits 20 may be provided on said chassis, by similar means to those described in the preceding paragraph. Said chassis is constructed in a like manner of a heavy gauge metal core 15 bounded on one or both sides by insulating material 17 to which the desired electrical components may be attached to provide a functioning electronic circuit.

Having fully described my invention, it is to be understood that I do not wish to be limited to the details set forth, but my invention is of the full scope of the appended claims.

I claim:

1. An electric circuit panel, comprising: a central supporting and conductive plate member forming the grounded side of an electric circuit; a lamination of insulating material on one side of said plate member; a printed circuit of conductive material disposed on said lamination of insulating material; a pair of laminations of insulating material on the other side of said plate member, one of said pair of laminations being capable of light transmission; and electrical devices mechanically supported by said plate member and electrically grounded thereto and connected with said printed circuit.

2. An electric circuit panel, comprising: a central supporting and conductive plate member forming the grounded side of an electric circuit; a lamination of insulating material on one side of said plate member; a pointed circuit of conductive material disposed on said lamination of insulating material; a pair of laminations of insulating material on the other side of said plate member, one of said pair of laminations being capable of light transmission; a light-emitting unit fitted in said plate member and electrically connected thereto and to said printed circuit, said unit disposed below the external surface of said pair of laminations for transmitting light through said light-transmitting lamination.

References Cited in the file of this patent

UNITED STATES PATENTS

| | | |
|---|---|---|
| 1,659,309 | Auld | Feb. 14, 1928 |
| 1,718,993 | Wermine | July 2, 1929 |
| 2,586,854 | Myers | Feb. 26, 1952 |